(12) United States Patent
Geng

(10) Patent No.: US 10,277,044 B2
(45) Date of Patent: Apr. 30, 2019

(54) CHARGING SYSTEM AND METHOD

(71) Applicant: CHEVRON (HK) LIMITED, Wanchai (HK)

(72) Inventor: Zheng Geng, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 187 days.

(21) Appl. No.: 15/356,856

(22) Filed: Nov. 21, 2016

(65) Prior Publication Data

US 2017/0155262 A1    Jun. 1, 2017

(30) Foreign Application Priority Data

Nov. 27, 2015    (CN) .......................... 2015 1 0849473

(51) Int. Cl.
*H02J 7/00* (2006.01)
*H02J 7/04* (2006.01)

(52) U.S. Cl.
CPC .......... *H02J 7/0044* (2013.01); *H02J 7/0006* (2013.01); *H02J 7/007* (2013.01); *H02J 7/0021* (2013.01); *H02J 7/041* (2013.01); *H02J 7/047* (2013.01)

(58) Field of Classification Search
CPC .. H02J 7/007; H02J 7/041; H02J 7/047; H02J 7/0006; H02J 7/0021; H02J 7/0044

USPC .......................... 320/110, 112–115, 107, 128
See application file for complete search history.

(56) References Cited

U.S. PATENT DOCUMENTS

| 2005/0099154 A1* | 5/2005 | Ohnuma | H02J 7/0091 320/107 |
| 2011/0248681 A1* | 10/2011 | Miller | H02J 7/0018 320/126 |
| 2015/0130417 A1* | 5/2015 | Song | H02J 7/0052 320/112 |

* cited by examiner

*Primary Examiner* — Zixuan Zhou
(74) *Attorney, Agent, or Firm* — Greenberg Traurig, LLP

(57) ABSTRACT

A charging system includes a first battery pack having a first capacity, a second battery pack having a second capacity and a charger for charging the first battery pack and the second battery pack. When the first battery pack is charged by the charger at a predetermined charging current I, a first charging time in which the first battery pack reaches a predetermined temperature T is set as a predetermined time t. When the second battery pack is charged by the charger at the predetermined charging current I, and when a second charging time of the second battery pack reaches the predetermined time t, the second battery pack is charged at a lower charging current. The first capacity is less than the second capacity.

8 Claims, 2 Drawing Sheets

CHARGING SYSTEM AND METHOD

RELATED APPLICATION INFORMATION

This application claims the benefit under 35 U.S.C. § 119(a) of Chinese Patent Application No. CN 201510849473.3, filed on Nov. 27, 2015, the disclosure of which is incorporated herein by reference in its entirety.

FIELD OF THE DISCLOSURE

The present disclosure relates generally to a charging system and a charging method utilizing the charging system.

BACKGROUND OF THE DISCLOSURE

Currently known chargers usually can be used only with battery packs with the same capacity. The chargers are configured with a corresponding charging process so as to satisfy the requirements of safety. However, at present, the capacity of battery packs is upgrading rapidly. If an upgraded battery pack is charged by a currently known charger, the battery pack will over heat so that the safety cannot be ensured.

The statements in this section merely provide background information related to the present disclosure and may not constitute prior art.

SUMMARY

In one aspect of the disclosure, a charging system includes a first battery pack having a first capacity, a second battery pack having a second capacity and a charger for charging the first battery pack and the second battery pack. When the first battery pack is charged by the charger at a predetermined charging current I, a first charging time in which the first battery pack reaches a predetermined temperature T is set as a predetermined time t. When the second battery pack is charged by the charger at the predetermined charging current I, and when a second charging time of the second battery pack reaches the predetermined time t, the second battery pack is charged at a lower charging current. The first capacity is less than the second capacity.

In another aspect of the disclosure, a charging method includes charging a first battery pack at a predetermined charging current I until the first battery pack reaches a predetermined temperature T, and recording an experienced time as a predetermined time t, and charging a second battery pack at the predetermined charging current I for the predetermined time t and, then charging the second battery pack at a lower charging current less than the predetermined charging current I. A first capacity of the first battery pack is less than a second capacity of the second battery pack.

Further areas of applicability will become apparent from the description provided herein. It should be understood that the description and specific examples are intended for purposes of illustration only and are not intended to limit the scope of the present disclosure.

Figure 1:
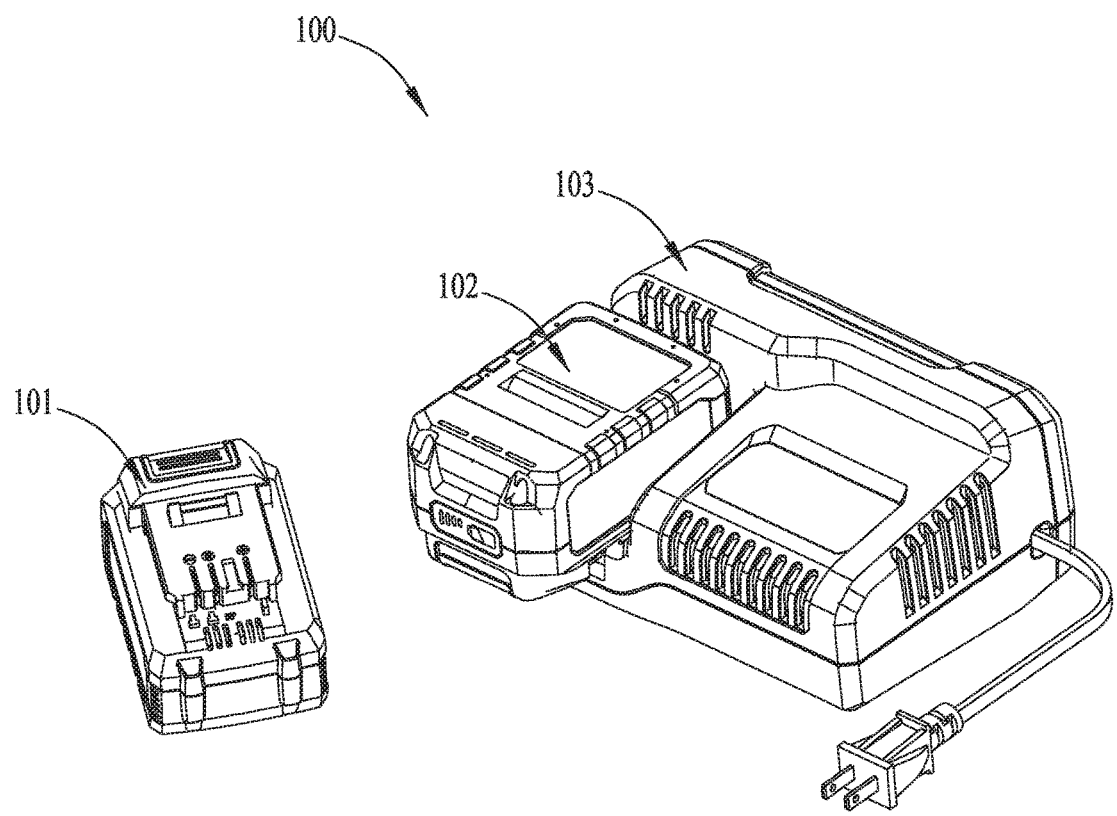
FIG. 1 is a schematic view of an exemplary charging system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the scope of the invention hereinafter claimed, its application, or uses.

As shown in FIG. 1, a charging system 100 includes a first battery pack 101, a second battery pack 102 and a charger 103.

The first battery pack 101 has a first capacity which is less than a second capacity of the second battery pack 102. The first and second battery packs 101, 102 can have the same kind of cells. The first battery pack 101 has a first number of cells which is less than a second number of cells of the second battery pack 102.

The charger 103 is capable of charging the first and second battery packs 101, 102. Further, the charger 103 is capable of charging the first and second battery packs 101, 102 respectively or simultaneously.

When the charger 103 charges the first battery pack 101 at a predetermined charging current I, the first battery pack 101 takes a predetermined time t to reach a predetermined temperature T. The predetermined time t is set in the charger 103.

The charger 103 can charge the second battery pack 102 at the constant predetermined charging current I. When a second charging time of the second battery pack 102 charged at the predetermined charging current I reaches the predetermined time t, the constant charging current is reduced, and the second battery pack 102 is charged at a lower charging current.

Here, the second charging time of the second battery pack 102 charged at the predetermined charging current I may be a continuous time period or a discontinuous time period.

For the first battery pack 101, when it is charged, firstly the charger 103 charges first battery pack 101 at a constant current, and then charges at a constant voltage. That is, a charging process of the first battery pack 101 includes a constant-current charging process and a constant-voltage charging process. Specifically, the constant-current charging process uses the predetermined charging current I.

For the second battery pack 102, when it is charged, firstly the charger 103 charges the second battery pack 102 at a higher constant current, then charges at a lower constant current, and finally charges with a constant voltage. That is, a charging process of the second battery pack 102 includes two constant-current charging processes and a constant-voltage charging process. The higher constant current in the first constant-current charging process can be the predetermined charging current I, and the lower constant current in the second constant-current charging process is less than the predetermined charging current I.

Alternatively, for the second battery pack 102, it can be charged with the lower constant current firstly and then with the predetermined charging current I. In either case, the total charging time of the second battery pack 102 charged at the predetermined charging current I is less than or equal to the predetermined time t.

Otherwise, when the first battery pack 101 reaches the predetermined temperature T, the charger 103 stops charging the first battery pack 101.

A maximum time in which the charger 103 outputs the predetermined charging current I is set as the predetermined time t. Thus, charging safety can be ensured.

A charging method based on the charging system 100 described above is illustrated as following. The charging method includes: charging the first battery pack 101 at the constant predetermined charging current I until the first battery pack 101 reaches the predetermined temperature T; recording an experienced time of the first battery pack 101 as the predetermined time t; charging the second battery pack 102 at the constant predetermined charging current I until the second charging time reaches the predetermined time t, and then charging the second battery pack 102 at a lower constant currant which is less than the predetermined charging current I.

Thus, the charger 103 is compatible with two battery packs with different capacities, and the charging safety can be ensured.

The predetermined time t can be stored in the charger 103 that functions to charge the first and second battery packs 101, 102. So when the charger 103 charges the second battery pack 102, the stored predetermined time t can be used. Otherwise, the charger 103 can detect or distinguish different battery packs so as to apply different charging processes.

Specifically, when charging the first battery pack 101, firstly it is charged with a constant-current charging, and then with a constant-voltage charging. When charging the second battery pack 102, firstly it is charged with a higher constant-current charging, then with a lower constant-current charging, and finally with a constant-voltage charging. When the first battery pack 101 reaches the predetermined temperature T, stopping charging the first battery pack 101.

Figure 2:
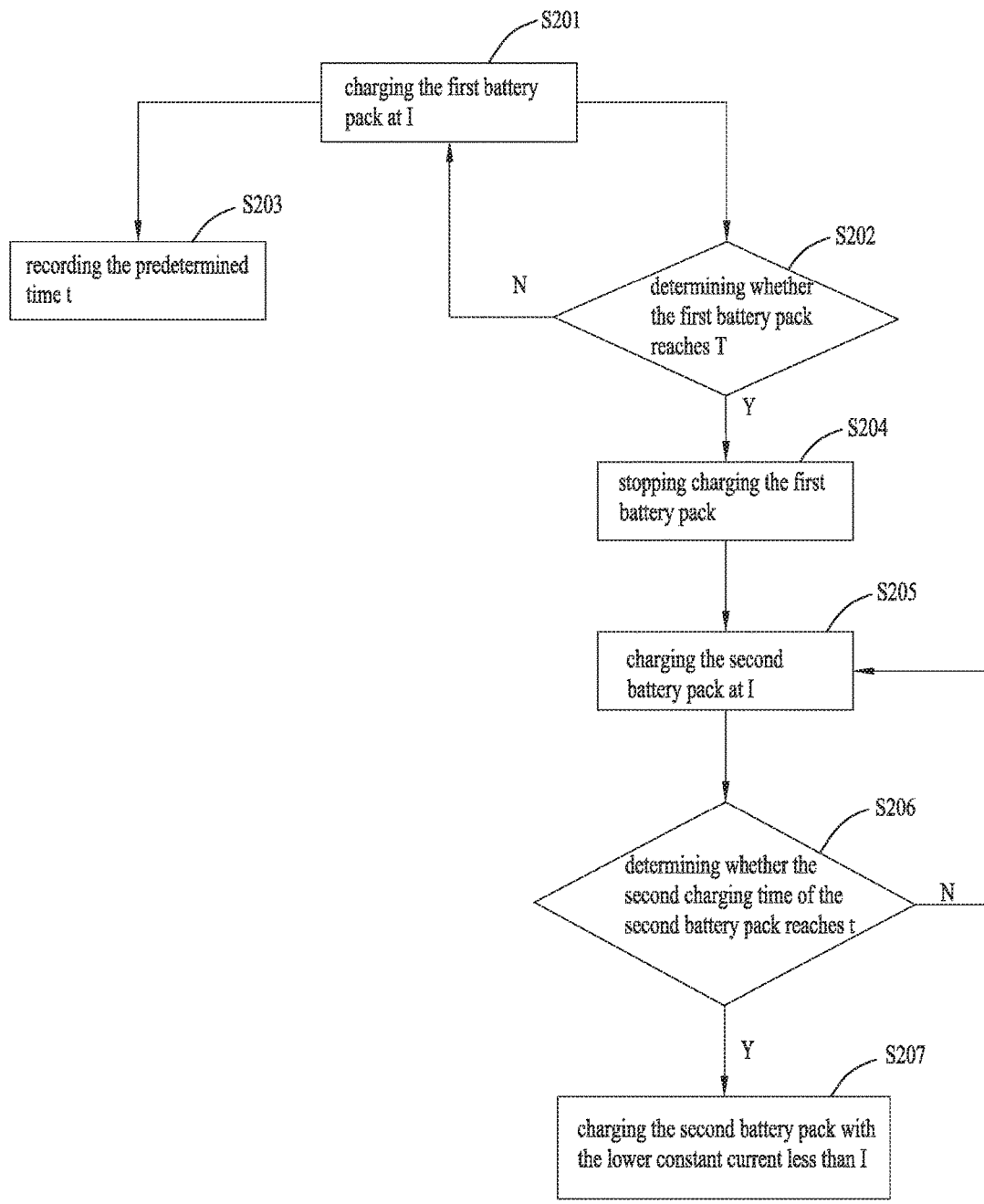
FIG. 2 a flowchart illustrating an exemplary charging method of the charging system.

As shown in FIG. 2, the charging method based on the charging system 100 includes steps as following:

S201: charging the first battery pack at the constant predetermined charging current I;

S202: determining whether the first battery pack reaches the predetermined temperature T, if yes, performing step S204, if not, going back to S201;

S203: recording the experienced time in which the first battery pack is charged at the constant predetermined charging current I and reaches the predetermined temperature T as the predetermined time t;

S204: stopping charging the first battery pack;

S205: charging the second battery pack at the constant predetermined charging current I;

S206: determining whether the second charging time of the second battery pack reaches the predetermined time t, if yes, performing step S207, if not, going back to step S205;

S207: charging the second battery pack with the lower constant current less than the predetermined charging current I.

The above illustrates and describes basic principles, main features and advantages of the invention hereinafter claimed. Those skilled in the art should appreciate that the above embodiments do not limit the present invention in any form. Technical solutions obtained by equivalent substitution or equivalent variations all fall within the scope of the present invention.

What is claimed is:

1. A charging system, comprising:
a first battery pack having a first capacity;
a second battery pack having a second capacity; and
a charger for charging the first battery pack and the second battery pack,
wherein, when the first battery pack is charged by the charger at a predetermined charging current (I), a first charging time in which the first battery pack reaches a predetermined temperature (T) during charging using the predetermined charging current (I) is set as a predetermined time (t),
wherein, when the second battery pack is charged by the charger at the predetermined charging current (I) and when a second charging time of the second battery pack reaches the predetermined time (t), the second battery pack is charged at a lower charging current,
wherein the first capacity is less than the second capacity, and
wherein, when the first battery pack reaches the predetermined temperature (T) while the first battery pack is being charged by the charger, the charger stops charging the first battery pack.

2. The charging system of claim 1, wherein, when the first battery pack is charged by the charger, firstly it is charged with a constant current charging and then with a constant voltage charging.

3. The charging system of claim 1, wherein, when the second battery pack is charged by the charger, firstly it is charged with a higher constant current charging, then with a lower constant current charging, and finally with a constant voltage charging.

4. The charging system of claim 1, wherein a maximum time in which the charger outputs the predetermined charging current (I) is equal to the predetermined time (t).

5. A charging method, comprising:
charging a first battery pack at a predetermined charging current (I) until the first battery pack reaches a predetermined temperature (T) and recording as a predetermined time (t) an experienced charging time until the first battery reaches the predetermined temperature (T); and
charging a second battery pack at the predetermined charging current (I) for the predetermined time (t) and then charging the second battery pack at a lower charging current less than the predetermined charging current (I),
wherein a first capacity of the first battery pack is less than a second capacity of the second battery pack, and
wherein, when the first battery pack reaches the predetermined temperature (T) during the step of charging the first battery pack, stopping a charging the first battery pack.

6. The charging method of claim 5, wherein, when charging the first battery pack, firstly applying a constant current charging and then applying a constant voltage charging.

7. The charging method of claim 6, wherein, when charging the second battery pack, firstly applying a higher constant current charging, then applying a lower constant current charging, and finally applying a constant voltage charging.

8. The charging method of claim 5, wherein the predetermined time (t) is stored in a charger which is capable of charging the first battery pack and the second battery pack.

* * * * *

UNITED STATES PATENT AND TRADEMARK OFFICE
CERTIFICATE OF CORRECTION

PATENT NO. : 10,277,044 B2
APPLICATION NO. : 15/356856
DATED : April 30, 2019
INVENTOR(S) : Zheng Geng Page 1 of 1

It is certified that error appears in the above-identified patent and that said Letters Patent is hereby corrected as shown below:

On the Title Page

Item (71) Applicant: [Chevron] should be "Chervon"

Signed and Sealed this
Seventeenth Day of September, 2024

*Katherine Kelly Vidal*

Katherine Kelly Vidal
*Director of the United States Patent and Trademark Office*